Sept. 15, 1931.                C. C. SPREEN                1,823,806
                    ICE MAKING AND SHAVING MACHINE
                        Filed April 29, 1927
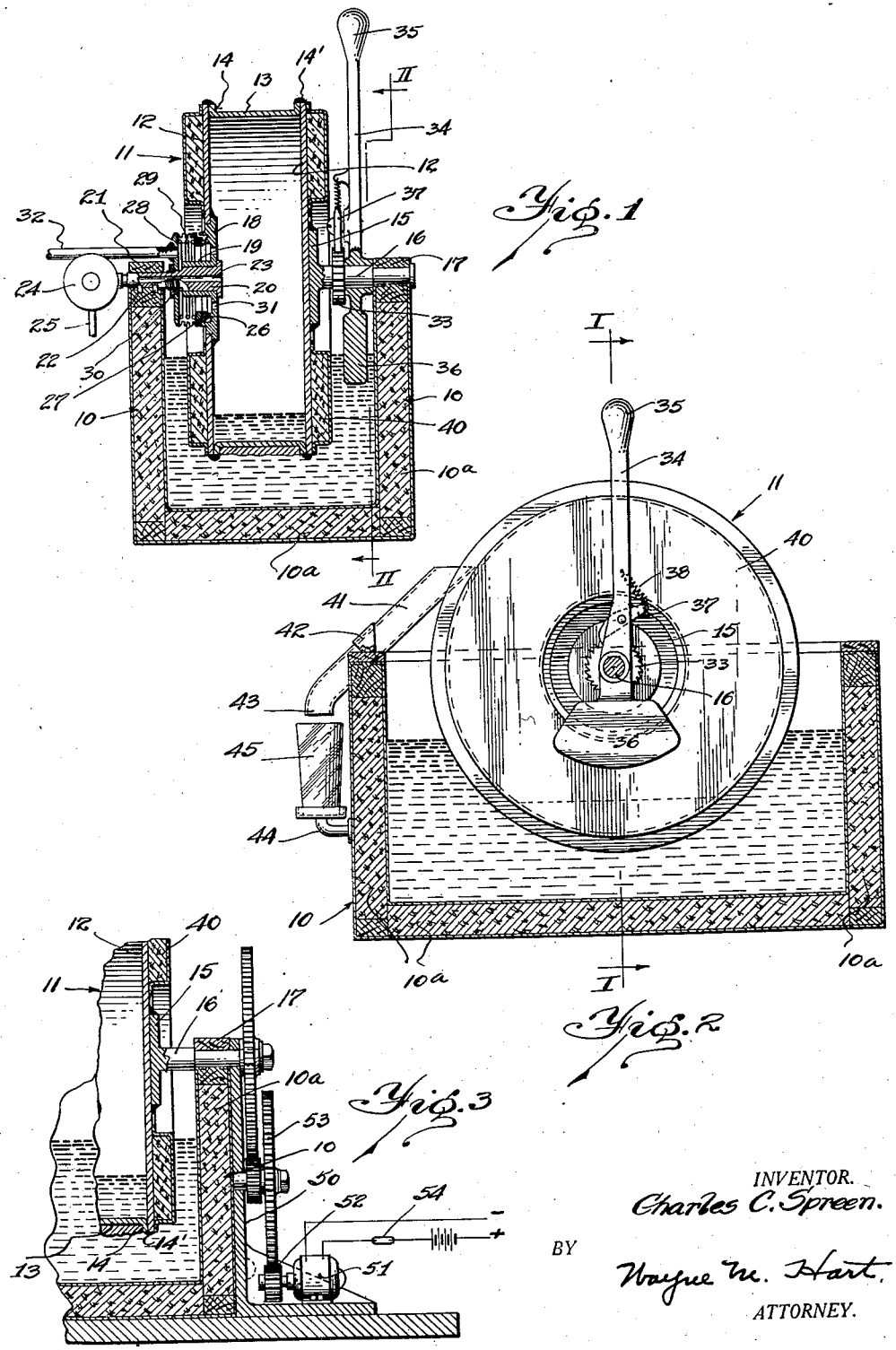
INVENTOR.
Charles C. Spreen.
BY
Wayne M. Hart,
ATTORNEY.

Patented Sept. 15, 1931

1,823,806

UNITED STATES PATENT OFFICE

CHARLES C. SPREEN, OF DETROIT, MICHIGAN, ASSIGNOR TO KELVINATOR CORPORATION, OF DETROIT, MICHIGAN, A CORPORATION OF MICHIGAN

ICE MAKING AND SHAVING MACHINE

Application filed April 29, 1927. Serial No. 187,544.

My invention relates generally to soda fountain equipment and is especially related to soda fountain equipment for making artificial ice and preparing the same for use in cooling soft drinks or other beverages.

It is customary at the present time, when serving soft drinks and other beverages in glasses, to deposit in such glasses a quantity of cracked ice to cool the beverage. In establishments where more modern methods and appliances are employed, the ice is shaved to effect a more rapid cooling of the beverage. When using either cracked or shaved ice, it is customary to store the prepared ice in a container which is maintained at a low temperature, but regardless of the care exercised in storing this ice, a considerable amount will be wasted by melting. Also, when shaved ice is stored, it is found that it tends to melt together, making it unfit for use, and furthermore any prepared ice that is left over at the close of business is generally wasted because it cannot be carried over until the following day.

Another disadvantage of the present system of storing cracked or shaved ice in storage containers is that it is unsanitary, as the ice absorbs impurities from the air. Furthermore, the ice is not always handled in a cleanly manner, being sometimes scooped up by hand, or by means of a dipper or spoon which is permitted to be about the counter when not in use, and which as a result, is not always perfectly clean. Also, the ice cake from which such ice is prepared is not always pure and free from dirt, such impure ice cakes being quite often used regardless of their condition. The present method of handling and preparing cracked or shaved ice for use with soft drinks or the like is therefore neither economical nor sanitary.

It is the object of my present invention to provide soda fountain equipment for economically manufacturing and preparing clean, fresh ice for use with soft drinks or other beverages.

A further object of my invention is to construct soda fountain equipment which offers better facilities for dispensing soft drinks or other beverages by providing an artificial ice making and preparing apparatus producing measured quantities of such ice as needed.

A further object of my invention is to provide equipment of the nature referred to whereby ice may be frozen, prepared for use and placed in glasses or other containers without being touched by hand or by any implement other than the equipment itself.

For a more detailed understanding of my invention, reference may be had to the accompanying drawings which illustrate one form which my invention may assume, and in which:

Fig. 1 is a vertical, cross-sectional view through an ice making and preparing apparatus embodying my invention, the section being taken substantially along the line I—I of Fig. 2.

Fig. 2 is a vertical, cross-sectional view of the structure illustrated in Fig. 1, the section being taken at right angles to Fig. 1 and along on the line II—II of Fig. 1; and Fig. 3 is a partial detail sectional view of a portion of the apparatus illustrated in Fig. 1, showing a modified form which my invention may assume.

My ice making and preparing machine is a self contained unit especially adapted for use with a mechanically refrigerated soda fountain, and provides an inexpensive and economical means for preparing ice for use with soft drinks or other beverages. This unit consists in general of a liquid container or reservoir 10, side and bottom walls which are hollow and filled with a suitable heat insulating material 10ª such as ground cork, or the like, and a freezing unit 11 rotatably supported and extending into the container 10 for the purpose of freezing thereon a quantity of ice. The freezing unit 11 consists of a drum which includes spaced side walls 12, to which is secured an annular rim 13, which is provided with outwardly turned flanges 14 along both edges which are welded or soldered as at 14' to the side wall sections 12.

One of the side wall sections 12 of said drum has secured thereto a disc 15 provided with an integral stub shaft 16 rotatably supported in a bearing block 17 mounted on one of the side walls of the liquid reservoir 10.

The opposite side wall section of the drum has secured thereto a flanged fitting 18 provided with a central hub portion 19, and a fixed stub shaft 20 is fitted through this hub portion 19 and secured to a support 21 carried by the opposite side wall of the reservoir 10 by pins or keys 22 which prevent said shaft from rotating, the drum being thus rotatably supported on this shaft. The shaft 20 is provided with a central longitudinal passageway 23 which extends the full length thereof, one end of said passage communicating with the interior of the drum, and the other end of said passage communicating with an expansion valve 24 connected with a refrigerant feed conduit 25, this expansion valve automatically controlling the amount of refrigerant admitted to the interior of the drum.

The flanged fitting 18 is provided with an external bearing face 26 against which a sealing ring 27 is yieldingly pressed by a longitudinally expansible bellows 29, one end of said bellows being anchored to a fixed shaft 20 by means of a nut 30, and the other end of said bellows bearing against the pressure ring 27. A spring 28, disposed internally of the bellows, serves to yieldingly expand the bellows and thus yieldingly force the movable end of the bellows against this ring 27 to maintain the sealing ring in leak-proof relation with the finished bearing surface 26 of the rotatable flanged fitting 18 carried by the rotatable drum-shaped freezing unit 11. The flanged fitting 18 is provided with a plurality of openings 31 which place the interior of the drum in communication with the interior of the bellows and a refrigerant return conduit 32, secured to the fixed end of the bellows 29, communicates with the interior of the bellows thus providing a refrigerant outlet for returning the expanded refrigerant to the compressor of the mechanical refrigerating apparatus.

Any suitable mechanism may be provided for rotating the drum-shaped freezing unit 11 preferably, I provide a ratchet wheel 33 which is secured to the stub shaft 16, and an actuating lever 34 which is rotatably mounted on the stub shaft 16 and which is provided with a handle 35 and a counter-weight 36. A ratchet or pawl 37 is pivoted to this actuating member, a spring 38 causing the ratchet to bear against the ratchet wheel 33. It may be seen that one may rock the actuating lever 34 and through the ratchet connection, thus rotate the drum-shaped freezing unit 11.

The freezing unit 11 is partially submerged in the water contained within said reservoir, and thus, some of the water will be congealed and deposited on the external surface of said drum-shaped freezing unit. I preferably limit the external surface area of the freezing unit which may become coated with the ice, this being preferably accomplished by insulating a portion of the external surface area of the freezing unit. A heat insulating member 40 is secured to the external surface of the side walls 12 of the drum thus permitting the ice to be deposited only on the rim portion of the drum, this ice being deposited thereon in the form of a thin sheet of ice, the said drum shaped freezing unit being rotated to elevate that portion of the drum on which is deposited the layer of ice so as to permit one to readily remove the ice therefrom when desired.

The removal of said ice is accomplished by scraping or shaving this layer of ice from the rim. I preferably accomplish this by providing a scraper 41 rigidly supported by means of a clamp 42 to one of the side walls of the water reservoir. This scraper is preferably tubular in cross-section and engages the full width of the rim 13, said scraper being adjusted and fixed in position so as to completely scrape the ice from said rim. This tubular scraper is substantially funnel-shaped and is provided with a down turned spout 43, positioned immediately above a bracket 44, preferably mounted on the external wall of the reservoir, the said bracket being adapted to support a glass 45 or other suitable container for receiving the ice as it is scraped from the freezing unit and falls by gravity downwardly through the combined scraper and chute.

In Figure 3 I have shown a modified construction wherein the freezing unit may be continuously rotated. A bracket 50 secured to the side wall of said reservoir 10 supports an electrical motor 51 which drives a gear 52 meshing with any suitable speed reducing transmission mechanism 53 for driving the stub shaft 16 secured to the drum-shaped freezing unit 11. A switch 54 is provided for cutting the motor in or out to control the operation of the ice making machine.

From the foregoing description it will be apparent that I have thus provided a very useful machine, that may be economically operated for making and preparing ice for use with soft drinks and other beverages. It is very desirable when serving soft drinks or other beverages to serve fresh clean ice, and the arrangement by which I scrape or shave off a small quantity of ice as needed, not only eliminates the possibility of the ice gathering impurities from the air, but permits me to use absolutely pure water for making absolutely clean fresh ice.

Although I have illustrated but one form which my invention may assume and have described in detail but a single application thereof, it will be apparent to those skilled in the art, that various modifications and changes may be made therein without departing from the spirit of my invention or from the scope of the appended claims.

What I claim is:

1. In a mechanical refrigerating apparatus, a refrigerant evaporator drum, means for rotatably supporting said drum including a rotatable shaft fixed to one end of said drum, and an externally disposed stationary shaft terminating adjacent the opposite end of said drum, said stationary shaft having a refrigerant inlet duct therein leading into said drum, and means associated with said stationary shaft for conducting vaporized refrigerant from said drum.

2. In a mechanical refrigerating apparatus, a refrigerant evaporator drum having exteriorly heat insulated ends and a heat conducting space therebetween, means for supplying a liquid in contact with the exterior of the heat conducting portion of said drum, means for rotatably supporting said drum including a rotatable shaft fixed to one end of said drum, and an externally disposed stationary shaft terminating adjacent the opposite end of said drum, said stationary shaft having a refrigerant inlet duct therein leading into said drum, and means associated with said stationary shaft for conducting vaporized refrigerant from said drum.

3. In a mechanical refrigerating apparatus, a refrigerant evaporator drum having heat insulated ends and a heat conducting space therebetween, a partially heat insulated reservoir adapted to receive a liquid to be applied to the heat conducting exterior surface of said drum, means for rotatably suspending said drum within said reservoir, said means including a rotatable shaft fixed to one end of said drum, and an externally disposed stationary shaft terminating adjacent the opposite end of said drum, said stationary shaft having a refrigerant inlet duct therein leading into said drum, and means associated with said stationary shaft for conducting vaporized refrigerant from said drum.

4. In a mechanical refrigerating apparatus, a refrigerant evaporator drum, means for rotatably supporting said drum including a rotatable shaft fixed to one end of said drum, and a stationary shaft extending through the other end of said drum, said stationary shaft having a refrigerant inlet duct therethrough leading into said drum, a hub secured to said drum for receiving said stationary shaft, said hub having apertures therethrough to permit escape of vaporized refrigerant from said drum, and sealed conduit means associated with said stationary shaft and drum.

5. In a mechanical refrigerating apparatus, a refrigerant evaporator drum, means for rotatably supporting said drum including a rotatable shaft fixed to one end of said drum, and a stationary shaft extending through the other end of said drum, said stationary shaft having a refrigerant inlet duct therethrough leading into said drum, a hub secured to said drum for receiving said stationary shaft, said hub having apertures therethrough to permit escape of vaporized refrigerant from said drum, means enclosing the apertured portion of said hub for sealing the joint between said stationary shaft and said hub, said means forming an outlet for refrigerant vaporized in said drum, and a conduit communicating with said sealing means.

6. In a mechanical refrigerating apparatus, a refrigerant evaporator drum, means for rotatably supporting said drum including a rotatably shaft fixed to one end of said drum, and a stationary shaft extending through the other end of said drum, said stationary shaft having a refrigerant inlet duct therethrough leading into said drum, a hub secured to said drum for receiving said stationary shaft, said hub having apertures therethrough to permit escape of vaporized refrigerant from said drum, an expansible bellows fixed to said stationary shaft and in rotatable frictional engagement with said hub, said bellows being adapted to seal the joint between said stationary shaft and said hub and forming an outlet for the expanded refrigerant, and means for conducting vaporized refrigerant from said outlet.

In testimony whereof I hereunto affix my signature.

CHARLES C. SPREEN.